United States Patent [19]

Farris

[11] 4,324,311
[45] Apr. 13, 1982

[54] ACTUATOR FOR AN AIR GUN HAVING A RECIPROCATING SHUTTLE VALVE

[75] Inventor: Richard C. Farris, Dickinson, Tex.

[73] Assignee: Western Geophysical Co. of America, Houston, Tex.

[21] Appl. No.: 180,788

[22] Filed: Aug. 25, 1980

[51] Int. Cl.³ .................... G01V 1/38; G01V 1/137
[52] U.S. Cl. ................................ 181/120; 367/144
[58] Field of Search ............... 181/118, 120; 367/144

[56] References Cited

U.S. PATENT DOCUMENTS 4,180,139  12/1979  Walker ........................... 181/120
4,211,300  7/1980  Miller ............................ 181/120

*Primary Examiner*—Howard A. Birmiel
*Attorney, Agent, or Firm*—William A. Knox

[57] ABSTRACT

A shuttle valve is slidingly provided within a firing chamber. A shuttle valve actuation control chamber is mounted at each end of the firing chamber. Pressurized air applied to a control chamber at one end of the firing chamber drives the shuttle valve to the opposite end of the firing chamber. An air accumulator chamber having a pressurized-air inlet is mounted adjacent each control chamber. An air passageway having a choke interconnects the firing chamber with the air accumulation chamber. A poppet valve interconnects each accumulator chamber with the adjacent control chamber to selectively apply pressurized air to one or the other of the control chambers. A solenoid vent valve fluidly communicates with each shuttle valve actuation control chamber. A bypass line fluidly interconnects each control chamber with the solenoid vent valve at the opposite end of the firing chamber.

7 Claims, 1 Drawing Figure

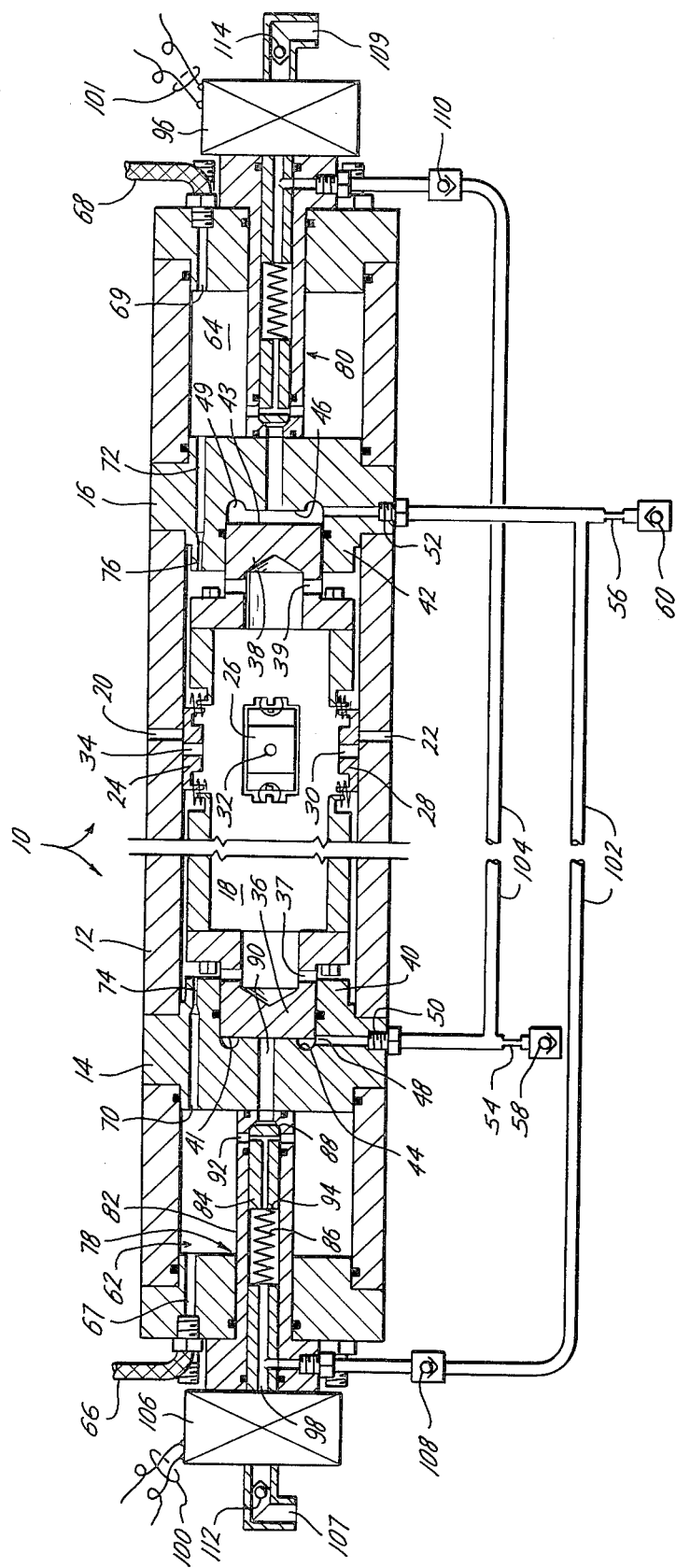

ACTUATOR FOR AN AIR GUN HAVING A RECIPROCATING SHUTTLE VALVE

BACKGROUND OF THE INVENTION

1. Field of the Invention

This invention is concerned with an air gun having a reciprocating shuttle valve for use in marine seismic exploration such as will be found in class 181/120.

2. Description of the Prior Art

The subject matter of this invention provides an improvement for the air guns disclosed in U.S. Pat. Nos. 4,180,139, 4,211,300 and a copending application Ser. No. 135,398, all of which are commonly owned by the assignee of this invention. U.S. Pat. No. 4,211,300 is incorporated herein by reference with respect to features that are common to that patent and to this disclosure.

U.S. Pat. No. 4,211,300 discloses an air gun that consists of an elongated cylindrical housing, closed at both ends by end plates, for containing a volume of compressed air and which forms a firing chamber. A radially-positioned air exhaust port is bored through the wall of the housing. A hollow cylindrical shuttle valve is mounted concentrically inside the housing. The shuttle valve is adapted to slide linearly back and forth, inside the housing, in alternate strokes. A radially-positioned sealing pad, having an orifice that is alignable with the exhaust port, is mounted in the wall of the shuttle. When the shuttle is positioned at either end of the housing, the pad blocks the exhaust port. When the shuttle is driven from one end of the housing to the other end, the orifice in the pad passes by the exhaust port and momentarily unblocks the exhaust port to impulsively release some of the compressed air from the firing chamber.

The shuttle valve is pneumatically driven from one end of the housing to the other. The ends of the hollow shuttle are closed by end faces. A space between the shuttle end faces and the respective end plates of the housing form shuttle-actuation control chambers. When the shuttle is at rest, an air bleed valve reduces the air pressure in the actuation control chambers to ambient. To fire the gun, an air diverter valve diverts some of the compressed air from the firing chamber to a shuttle-actuation control chamber at one end of the housing. The inrush of compressed air greatly exceeds the air leakage rate through the air bleed valve in that chamber; the shuttle valve is therefore pneumatically accelerated towards the opposite end of the housing. For the next stroke, a diverter valve at the other end of the gun diverts air from the firing chamber to the other actuation control chamber to drive the shuttle valve back to the first end of the housing. Thus, the shuttle is driven back and forth, within the housing, in alternate strokes. Each time the orifice in the sealing pad passes by the exhaust port, some of the compressed air is released from the firing chamber to generate an acoustic pulse.

As taught by the above-referenced patent, compressed air was admitted through a single opening directly into the main firing chamber. Some of the compressed air was then diverted from the firing chamber to one or the other of the shuttle-actuation control chambers to fire the gun. When the gun was fired, there was a considerable momentary pressure drop as the compressed air was released from the firing chamber through the exhaust port. The pressure drop in the firing chamber was unavoidably communicated to the actuation control chamber through the diverter valve. The reduced pressure was at times insufficient to drive the shuttle completely to the far end of the housing; the shuttle hung up in mid-stroke. Furthermore, when the ambient water pressure exceeded the air pressure drop, the gun became flooded.

Another problem involved shuttle-valve lubrication. Lubrication of the shuttle valve and the moving parts of the diverter valves depended on the oil vapor content of the compressed air. The oil vapor may be derived from piston-ring blow-by in the air compressor cylinders or oil vapor may be furnished by a vaporizer connected in the compressed air line. With but a single inlet for the compressed air, oil-vapor distribution became unbalanced. Accordingly, certain moving parts had a tendency to freeze-up due to lack of lubrication.

SUMMARY OF THE INVENTION

It is an object of this invention to provide a substantially constant-pressure supply of air to the actuation control chambers of a reciprocating-shuttle air gun, regardless of a pressure drop in the main firing chamber. The pressurized air thus supplied must be sufficient to overcome the increased resistance to shuttle motion when the gun is deployed at great depths.

It is another object of this invention to provide a means for purging water from the shuttle-actuation control chambers if the gun becomes flooded.

Finally it is an object of this invention to provide a better distribution of lubricant to the sliding parts of the valving.

In a preferred embodiment of this invention, an air accumulator chamber is provided at each end of a reciprocating shuttle air gun. Compressed air is admitted to each accumulator chamber. Each accumulator chamber communicates with the firing chamber through a passageway, including a choke, to charge the firing chamber with compressed air. The choke isolates the accumulator chamber from a momentary pressure drop in the firing chamber. Accordingly, the full pressure of the compressed air is available from the accumulator chambers for application to one or the other of the shuttle-actuation control chambers at gun fire-time.

In accordance with an aspect of this invention, each shuttle-actuation control chamber is fluidly coupled in parallel by a bypass line to a bleed valve and to a solenoid-operated vent valve located at the opposite end of the gun. The solenoid vent valves are associated with the poppet valves that admit compressed air to the corresponding actuation control chambers from the respective accumulator chambers. When one vent valve is opened, the associated poppet valve is actuated to admit air to the actuation control chamber to drive the shuttle to the opposite end of the gun. At the same time, the back pressure in the actuation control chamber at the opposite end of the gun is vented through the bypass line. When both vent valves are opened, water entrapped in either or both actuation control chambers is blown out through the opposite vent valves.

BRIEF DESCRIPTION OF THE DRAWING

The novel features of this invention will best be understood by reference to the sole drawing which represents a cross section of the air gun of this invention.

DETAILED DESCRIPTION OF THE PREFERRED EMBODIMENT

The principle novel features of the air gun of this invention are shown in the sole drawing. Construction and operation of a reciprocating-shuttle type air gun has been disclosed in detail in the aforementioned U.S. Pat. No. 4,211,300. Accordingly only a brief outline will be presented here of the features common to the patent and to this disclosure.

Air gun 10 consists of a housing 12, preferably cylindrical, closed by end plates 14, 16. A hollow shuttle valve 18 is mounted concentrically with housing 12 and may slide linearly back and forth within housing 12. Exhaust ports such as 20, 22 are drilled through housing 12. Sealing pads 24, 26, 28 are floatingly mounted in the wall of hollow shuttle 18. Each sealing pad defines one or more orifices 30, 32, 34 that are alignable with corresponding exhaust ports. When the shuttle is at rest at either end of the housing, the sealing pads block the exhaust ports. When the shuttle executes a stroke as from the left hand end of the gun to the right hand end, the orifices momentarily unblock the exhaust ports as they pass by the exhaust ports to emit a jet of compressed air from hollow shuttle 18.

Shuttle 18 has reduced end portions 36, 38 that slide inside hollow bosses or shoulders 40, 42 that form the inner part of end plates 14, 16. The volumes between the end faces 41, 43 of the reduced shuttle end portions 36, 38, and the inner walls 44, 46 of end plates 14, 16, form shuttle-actuation control chambers 48, 49, most clearly shown as chamber 49 at the right hand end of gun 10. Reduced end portions 36 and 38 of shuttle valve 18 have several openings such as 37 and 39 to permit the air pressure inside and outside of shuttle 18 to become equalized. The air pressure inside the actuation control chambers is held at ambient pressure by permanent air leaks 50 and 52. The leakage rate is adjusted by metering orifices 54, 56 and air-bleed check valves 58, 60.

Air accumulator chambers 62, 64 are secured to end plates 14, 16 of gun 10 adjacent the shuttle-actuation control chambers. Compressed air from an air compressor, not shown, is fed through hoses 66, 68 and air inlets 67, 69 to the respective accumulator chambers 62, 64. Hoses 66, 68 are connected to a single supply hose, also not shown, by a conventional tee-fitting. From the accumulator chambers, compressed air flows into the firing chamber, formed by housing 12 and hollow shuttle 18, through passageways 70, 72 which include restrictions or chokes 74, 76. The chokes allow the firing chamber to become gradually pressurized between shots. But when a shot is fired the concomitant momentary pressure drop in the firing chamber is not transmitted back to the accumulator chambers 62, 64.

Poppet valve assemblies 78 and 80 are provided in accumulator chambers 62 and 64. The purpose of the poppet valves is to admit pressurized air, on command, to one or the other of the actuation control chambers to pneumatically drive shuttle valve 18 in the direction opposite to the applied pressure. Since both poppet valves are identical, only poppet valve 78 will be described in detail.

Poppet valve 78 includes an outer housing 82 and a valve member 84 sliding within the outer housing. A spring 86 urges valve member 84 against a seat 88 to close passageway 90 between accumulator chamber 62 and actuation control chamber 48. A pressure equalization port 92 equalizes the air pressure between accumulator chamber 62 and the end face 94 of valve member 84. A solenoid air vent valve 106, such as a high-pressure Skinner valve is connected to an air vent line 98. Solenoid valve 106 is actuated by an electrical signal applied through conductors 100 from a control station, not shown.

In operation, upon command, an electrical signal is applied over conductors 100 to open solenoid vent valve 106. When the vent valve momentarily opens, the air pressure in vent line 98 is released upsetting the pressure equalization across valve member 84. The excess pressure in accumulator chamber 62 forces valve member 84 to the left against the pressure of spring 86, thus opening passageway 90. Compressed air from accumulator chamber 62 rushes into actuation control chamber 48, to drive shuttle valve 18 towards the right hand end of gun 10. The relative diameters of passageway 90 with respect to air-leakage metering orifice 54 is such that the volume of air entering actuation control chamber 48 substantially exceeds the air leakage rate through bleed valve 58. Normally, vent valve 106 is opened for but a few tens of milliseconds after which it is again closed. When vent valve 106 is again closed, compressed air flows through air equalization line 92 so that spring 86 can close poppet valve 78, cutting off further air flow to shuttle-actuation control chamber 48.

Bypass lines 102, 104 interconnect each actuation control chamber with the vent line and vent valve at the opposite end of gun 10. In normal operation, only one solenoid vent valve is opened at any given time. Thus if vent valve 106 is opened, poppet valve 78 is also open but the opposite vent valve 96 remains closed. Compressed air flows from accumulator chamber 62 into actuation control chamber 48 and through bypass line 104 to accumulator chamber 64. But since both accumulator chambers are at the same pressure, being supplied by the same main supply line, no net exchange of air results except for a small amount through metering orifice 54.

Shuttle-actuation control chamber 49 is connected to vent line 98 via bypass line 102. At the beginning of a shuttle actuation cycle, air pressure in chamber 49 is at ambient. But as shuttle valve 18 begins to move to the right, a back pressure builds up in actuation chamber 49, due to the diminishing volume, to offer increasing resistance to the movement of shuttle 18. However the increasing pressure in chamber 49 is relieved through bypass line 102, check valve 108 and vent line 98 so that no substantial back pressure is developed in chamber 49. However, the diameters of the orifices in poppet valves 78 and 80 are sized so that a small amount of air remains in chamber 49. The small amount of residual air provides a cushion when shuttle valve 18 completes a stroke at is extremity of trace such as at the right hand end of the gun. Check valve 108, of course, prevents flow of compressed air into chamber 49 when solenoid valve is closed. A similar sequence of events takes place at the right hand end when the shuttle valve is driven back to the left hand end of the gun for the next firing cycle.

If now, one or both shuttle-actuation control chambers becomes flooded, both vent valves are opened at the same time and remain open for a period of several seconds or minutes. Of course with vent valves 96 and 106 both open, poppet valves 78 and 80 are also open. No shuttle motion takes place because the air pressure is equalized at both ends of the shuttle valve. Air flowing from accumulator chambers 62 and 64 therefore blows whatever water is present in the actuation control chambers out through bypass lines 102 and 104 and the opposite vent valves 96 and 106 respectively. The air vents 107, 109 of the vent valves are substantially larger in diameter than the openings of the bleed valve orifices 54 and 56. Accordingly, while water in the actuation control chambers will tend to ooze out over a period of time through the bleed valves, it is rapidly blown out through the larger-diameter vents 107, 109 of the solenoid vent valves 106, 96 when they are open. Water that might accumulate in hollow shuttle valve 18 is readily blown out through exhaust ports 20 and 22 during normal operations. Check valves 108 and 110 are provided to prevent the high air pressure existing in the vent lines, during normal operation, from communicating with the opposite actuation control chamber which is at ambient pressure. Similarly, check valves 112 and 114 prevent the water under ambient pressure from entering the corresponding vent lines when the vent valves are open. Vent valve 96 is of course actuated by an electric signal transmitted through electrical conductor 101.

The moving parts of poppet valves 78 and 80 require lubrication. Since compressed air and the entrained oil vapor flows equally into each accumulator chamber through lines 66 and 68, and air inlets 67, 69 balanced lubrication is provided.

I claim as my invention:

1. In an air gun of the reciprocating shuttle type for underwater signalling, the gun having a firing chamber, a shuttle-actuation control chamber at each of opposite ends of the firing chamber for pneumatically reciprocating a shuttle valve back and forth in the firing chamber in alternate strokes, a solenoid vent valve and an air bleed valve fluidly communicating with each shuttle-actuation control chamber, the improvement comprising:

an air accumulator chamber having a pressurized-air inlet mounted adjacent each said shuttle-actuation control chamber;

a pneumatic poppet valve cooperating with each solenoid vent valve for selectively interconnecting first one and then the other of the air accumulator chambers with the adjacent shuttle valve actuation control chamber; and an air passageway, including a choke, for interconnecting the firing chamber with each said air accumulator chamber.

2. The improved air gun as defined in claim 1 comprising:

means for selectively actuating a poppet valve at one end of the firing chamber to pressurize the associated shuttle actuation control chamber, the other shuttle-actuation control chamber being unpressurized, pneumatically driving the shuttle valve towards the opposite end of the firing chamber.

3. The improved air gun as defined in claim 2 further comprising:

a bypass line fluidly interconnecting each said shuttle-actuation control chamber with the vent valve mounted at the opposite end of the firing chamber.

4. The improved air gun as defined in claim 2 comprising:

means for relieving the back pressure that develops in the unpressurized shuttle-actuation control chamber due to the motion of the shuttle valve as it is driven towards the opposite end of the firing chamber.

5. The improved air gun as defined in claim 3 comprising:

means for simultaneously opening both solenoid vent valves for a desired period of time thereby actuating both poppet valves so that the pressurized air from each air accumulator chamber purges unwanted fluids from the corresponding shuttle-actuation control chamber through the bypass lines to the open vent valves at the opposite ends of the firing chamber.

6. The improved air gun as defined in claim 4 comprising:

means, associated with the back-pressure relieving means, for providing a residual air cushion when the shuttle valve completes a stroke.

7. The improved air gun as defined in claim 1 comprising:

means for distributing a sufficient amount of oil vapor to said poppet valves.

* * * * *

UNITED STATES PATENT AND TRADEMARK OFFICE
CERTIFICATE OF CORRECTION

PATENT NO. : 4,324,311
DATED : April 13, 1982
INVENTOR(S) : Richard C. Farris

It is certified that error appears in the above-identified patent and that said Letters Patent are hereby corrected as shown below:

In the sole Figure, the direction of flow of bleed valve 58 should be reversed.

Signed and Sealed this

Twentieth Day of July 1982

[SEAL]

Attest:

Attesting Officer

GERALD J. MOSSINGHOFF

Commissioner of Patents and Trademarks